(12) United States Patent
Chkodrov et al.

(10) Patent No.: US 11,386,093 B2
(45) Date of Patent: Jul. 12, 2022

(54) STANDING QUERY CREATION USING STORE QUERY

(71) Applicant: Microsoft Technology Licensing, LLC, Redmond, WA (US)

(72) Inventors: Gueorgui B. Chkodrov, Redmond, WA (US); Russell Biles, Bellevue, WA (US); Vidhi Agarwal, Bellevue, WA (US); Marek Jedrzejewicz, Kirkland, WA (US); Andre O. Alfred, Redmond, WA (US); Justin Minaker, Seattle, WA (US); Lucius Fleuchaus, Redmond, WA (US); Dawn Burns, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 499 days.

(21) Appl. No.: 15/902,856

(22) Filed: Feb. 22, 2018

(65) Prior Publication Data

US 2019/0258734 A1    Aug. 22, 2019

(51) Int. Cl.
*G06F 16/00*     (2019.01)
*G06F 7/00*      (2006.01)
*G06F 16/2455*   (2019.01)
*G06F 16/242*    (2019.01)
*G06F 16/901*    (2019.01)
*G06F 16/2452*   (2019.01)

(52) U.S. Cl.
CPC .... *G06F 16/24568* (2019.01); *G06F 16/2443* (2019.01); *G06F 16/2452* (2019.01); *G06F 16/24564* (2019.01); *G06F 16/9024* (2019.01)

(58) Field of Classification Search
CPC .............. G06F 16/3338; G06F 16/285; G06F 16/24568; G06F 16/2443; G06F 16/2452; G06F 16/24564; G06F 16/9024
USPC ......................................................... 707/765
See application file for complete search history.

(56) References Cited

U.S. PATENT DOCUMENTS

| | | | |
|---|---|---|---|
| 2008/0114873 A1* | 5/2008 | Chakravarty | G06F 11/3072 709/224 |
| 2012/0054173 A1 | 3/2012 | Andrade et al. | |
| 2012/0284255 A1 | 11/2012 | Schechter et al. | |
| 2013/0097114 A1* | 4/2013 | Burke | G06F 16/2452 707/602 |

(Continued)

OTHER PUBLICATIONS

"International Search Report and Written Opinion Issued in PCT Application No. PCT/US2019/018135", dated Apr. 8, 2019, 11 Pages.

(Continued)

*Primary Examiner* — Raquel Perez-Arroyo
(74) *Attorney, Agent, or Firm* — Workman Nydegger

(57) ABSTRACT

The automated creation of a dataflow graph of a standing query. Once the standing query dataflow graph is created, events may be flowed into the dataflow graph to execute the standing query. In execution, a store query is accessed. The store query is structured in accordance with a store query language. A syntax graph (such as an abstract syntax tree) of the store query may then be generated. Then, using the syntax graph and a set of rules of the store query language, the dataflow graph is automatically generated. This significant speeds up and makes more easy and efficient the conversion of a store query into a standing query.

18 Claims, 6 Drawing Sheets

(56) References Cited

U.S. PATENT DOCUMENTS

| | | | |
|---|---|---|---|
| 2014/0095541 A1* | 4/2014 | Herwadkar | G06F 16/25 |
| | | | 707/774 |
| 2015/0248461 A1* | 9/2015 | Theeten | G06F 16/24568 |
| | | | 707/718 |
| 2016/0154855 A1* | 6/2016 | Hsiao | G06F 16/242 |
| | | | 707/759 |
| 2017/0039245 A1* | 2/2017 | Wholey, III | G06F 16/9024 |
| 2017/0091293 A1 | 3/2017 | Cummings et al. | |
| 2017/0132281 A1* | 5/2017 | Schechter | G06F 16/2428 |
| 2017/0364694 A1* | 12/2017 | Jacob | G06F 16/24534 |

OTHER PUBLICATIONS

"Azure Log Analytics Query Language", Retrieved From <<https://docs.microsoft.com/en-us/azure/application-insights/app-insights-analytics-reference#string>>, Retrieved on: Dec. 27, 2017, 2 Pages.

Griffiths, Ian, "Programming C# 5.0", Retrieved From <<http://shop.oreilly.com/product/0636920024064.do>>, Oct. 2012, 3 Pages.

"Readme.md", Retrieved From <<https://github.com/Microsoft/Tx/blob/master/Samples/RxWinforms/Readme.md>>, Retrieved on: Dec. 27, 2017, 1 Page.

"RxWinforms", Retrieved From <<https://github.com/Microsoft/Tx/tree/master/Samples/RxWinforms>>, Retrieved on Dec. 27, 2017, 2 Pages.

"LinqRxConcepts", Retrieved From <<https://github.com/Microsoft/Tx/tree/master/Samples/LinqRxConcepts>>, Retrieved on: Dec. 27, 2017, 2 Pages.

Sblom, et al., "Tx (LINQ to Logs and Traces)", Retrieved From <<https://github.com/Microsoft/Tx/blob/master/README.md>>, Retrieved on: Dec. 27, 2017, 2 Pages.

* cited by examiner

STANDING QUERY CREATION USING STORE QUERY

BACKGROUND

Computing systems and associated networks have greatly revolutionized our world ushering in what is now called the "information age". The amount of available information in the age can be enormous. Databases and data stores may store massive amounts of information. The ability to query against that data to find the most helpful data is thus critical to avoid information overload. Conventional data stores allow for stored data to be queried against. This is helpful for analyzing patterns in the data. For instance, if the data store includes events generated over a period of time, queries may be aimed at finding historical patterns in those events.

Standing queries allow for a different type of querying against data. A standing query defines a set of rules that are evaluated against events as those events occur or as those events arrive at the standing query. If an event satisfies the set of rules, the standing query returns the matching event, or data from that matching event. If the event does not match the standing query, it is simply discarded. This allows the standing query to operate on volumes of data that may be prohibitively expensive or impossible to store. The standing query is defined once, and returns data from matching events as they are received by the standing query. Standing queries are also termed as "real-time" queries, or "push" queries.

Store queries are structured in accordance with a store query language (e.g., a database query language such as SQL), whereas standing queries are structured in accordance with a standing query language (e.g., a real-time query languages). Store query languages and standing query languages can be quite different in their syntax and semantic expressions. Often, an individual having knowledge of a store query languages will not necessarily have knowledge of a real-time query language, and vice versa.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to using a store query to automatically create a dataflow graph that stands to receive events against which a standing query is executed. The result of inputting the event into the standing query is either that the event passes the dataflow graph in which case the event is a valid result of the standing query, or that the event is discarded by the dataflow graph resulting in the event not being a result of the standing query. Data may be extracted from matching events as a result of the standing query.

A standing query is different than a query on a store because standing query languages are typically different that store query languages. Thus, typically, one chooses what type of query is desired, and then drafts a query in a store or standing query language as appropriate. Standing queries are also functionally different than a store query because standing queries are made once, and stand in place with respect to a stream, filter through received events, and pass back any requested data from matching events. Thus, the result of the query is a stream of results that occur over time. This contrasts with a store query, which is issued once against stored data, executed once, and provides a single result in the form of a result set.

In accordance with the principles described herein, a query may be first drafted using a language for stored data, which will be called herein a "store query language." Then, if the logic of the store query is satisfactory, the store query may be used to automatically generate a dataflow graph of a standing query that executes the same logic as the store query. Thus, significant redrafting of the query is not required to generate a standing query that performs the same query on a stream that a store query can perform on a store. This significantly speeds up the rate at which a standing query may be generated based on an existing store query and guarantees fidelity in the logic of the standing query compared to the store query. Alternatively, this simplifies the process of generating a standing query for those that are more familiar with store query languages. Further, this alleviates the user from having to know that a standing query is being performed. From the user perspective, the user simply pass the same query they tried on stored data, and the logic automatically applies this stored query to a real-time feed.

In execution, a store query that is structured in accordance with a store query language is accessed. A syntax graph (such as an abstract syntax tree) of the store query may then be generated. Using a set of rules of the store query language, and the syntax graph, the dataflow graph is automatically generated. Then, if desired, a stream may be input into that dataflow graph to execute the standing query.

Although standing queries are very powerful, it can be challenging to formulate the right query. This is because the data on live feeds changes all the time. Accordingly, it is difficult for a human to decide if a change in the output was due to a query change (e.g. adjusting the filter) or a change of the incoming data (e.g. more events matching the filter). This challenge does not exist for queries on stored data, as the user can always select time-range in which the data is stable and then try various adjustments to the query.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
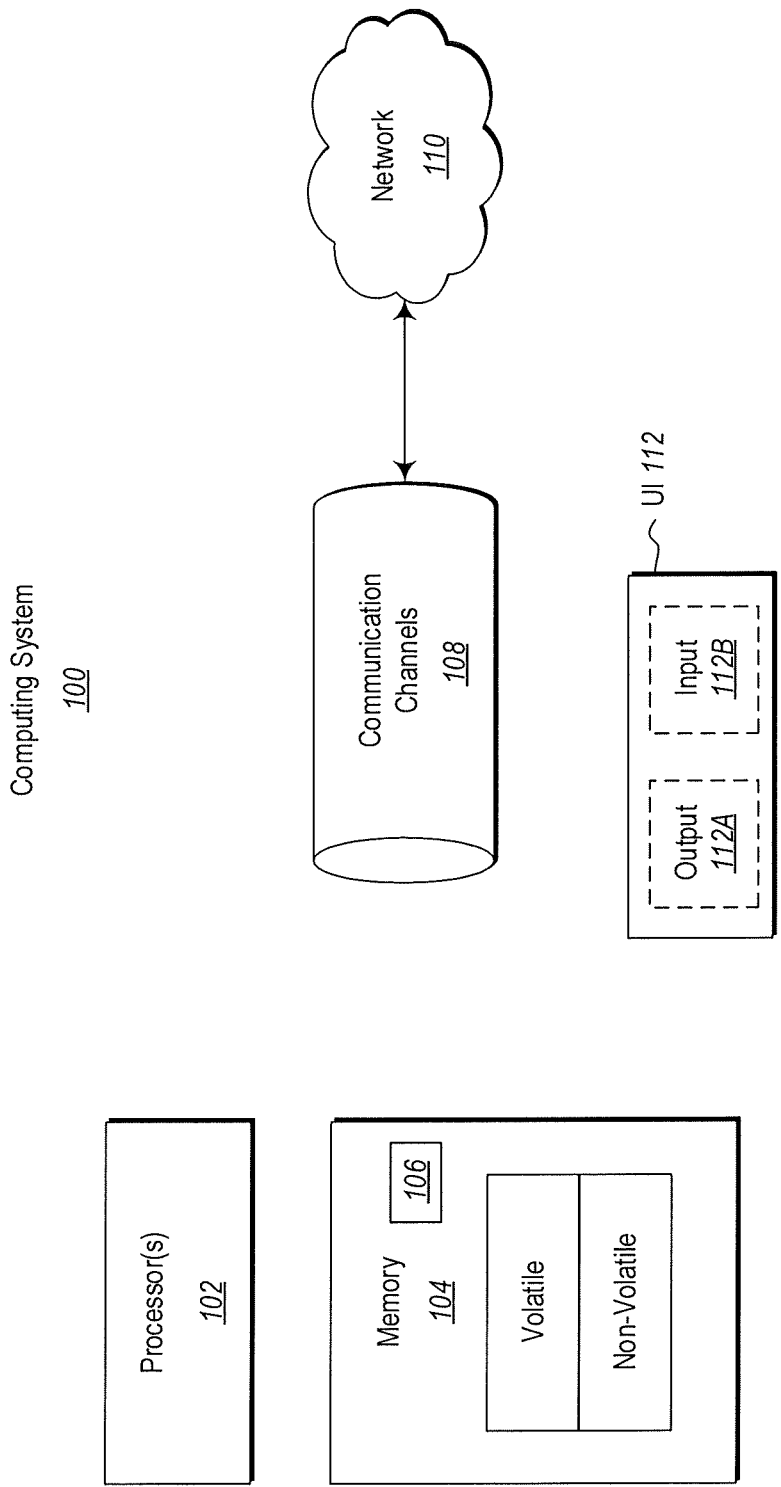
FIG. 1 illustrates an example computer system in which the principles described herein may be employed.

At least some embodiments described herein relate to using a store query to automatically create a dataflow graph that stands to receive events against which the standing query is executed. The result of inputting the event into the standing query is either that the event passes the dataflow graph in which case the event is a valid result of the standing query, or that the event is discarded by the dataflow graph resulting in the event not being a result of the standing query. Data may be extracted from matching events as a result of the standing query.

A standing query is different that a query on a store because standing query languages are typically different that store query languages. Thus, typically, one chooses what type of query is desired, and then drafts a query in a store or standing query language as appropriate. Standing queries are also functionally different than a store query because standing queries are made once, and stand in place with respect to a stream, filter through received events, and pass back any requested data from matching events. Thus, the result of the query is a stream of results that occur over time. This contrasts with a store query, which is issued once against stored data, executed once, and provides a single result in the form of a result set.

In accordance with the principles described herein, a query may be first drafted using a language for stored data, which we call herein a "store query language." Then, if the logic of the store query is satisfactory, the store query may be used to automatically generate a dataflow graph of a standing query that executes the same logic as the store query. Thus, significant redrafting of the query is not required to generate a standing query that performs the same query on a stream that a store query can perform on a store. This significantly speeds up the rate at which a standing query may be generated based on an existing store query, and guarantees fidelity in the logic of the standing query compared to the store query. Alternatively, this simplifies the process of generating a standing query for those that are more familiar with store query languages. Further, this alleviates the user from having to know that a standing query is being performed. From the user perspective, the user simply pass the same query they tried on stored data, and the logic automatically applies this stored query to a real-time feed.

In execution, a store query that is structured in accordance with a store query language is accessed. A syntax graph (such as an abstract syntax tree) of the store query may then be generated. Using a set of rules of the store query language, and the syntax graph, the dataflow graph is automatically generated. Then, if desired, a stream may be input into that dataflow graph to execute the standing query.

Although standing queries are very powerful, it can be challenging to formulate the right query. This is because the data on live feeds changes all the time. Accordingly, it is difficult for a human to decide if a change in the output was due to a query change (e.g. adjusting the filter) or a change of the incoming data (e.g. more events matching the filter). This challenge does not exist for queries on stored data, as the user can always select time-range in which the data is stable and then try various adjustments to the query.

Because the principles described herein operate in the context of a computing system, a computing system will be described with respect to FIG. 1. Then, the generation and use of a standing query that includes a store query portion will then be described with respect to the remaining drawings.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
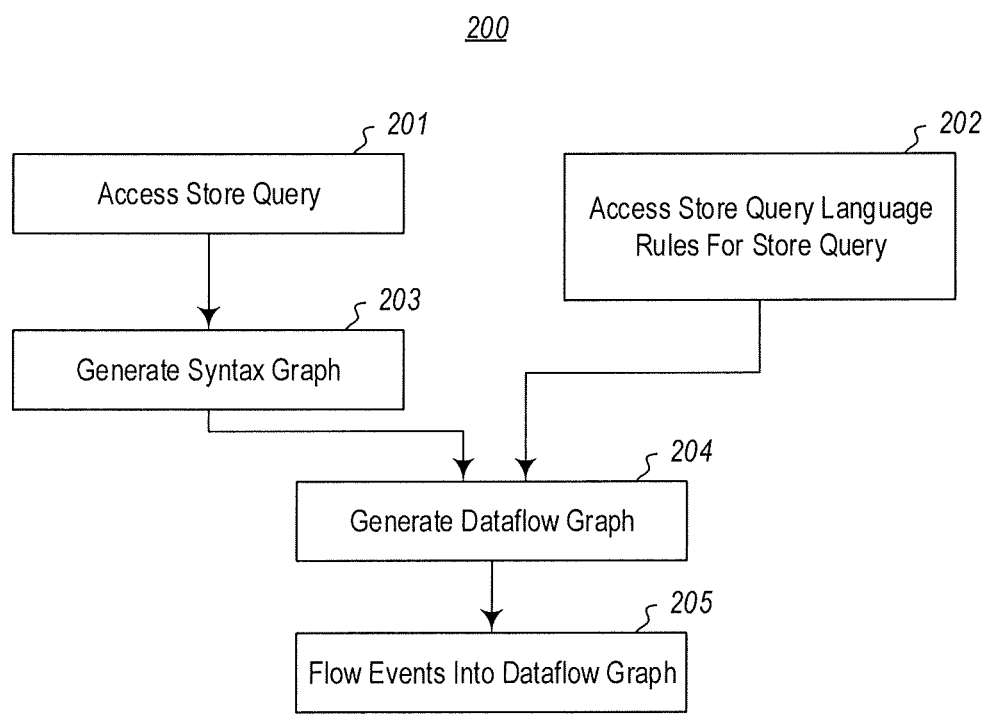
FIG. 2 illustrates a flowchart of a method for creating a dataflow graph of a standing query using a store query portion that is structured in accordance with a store query language.
Figure 3:
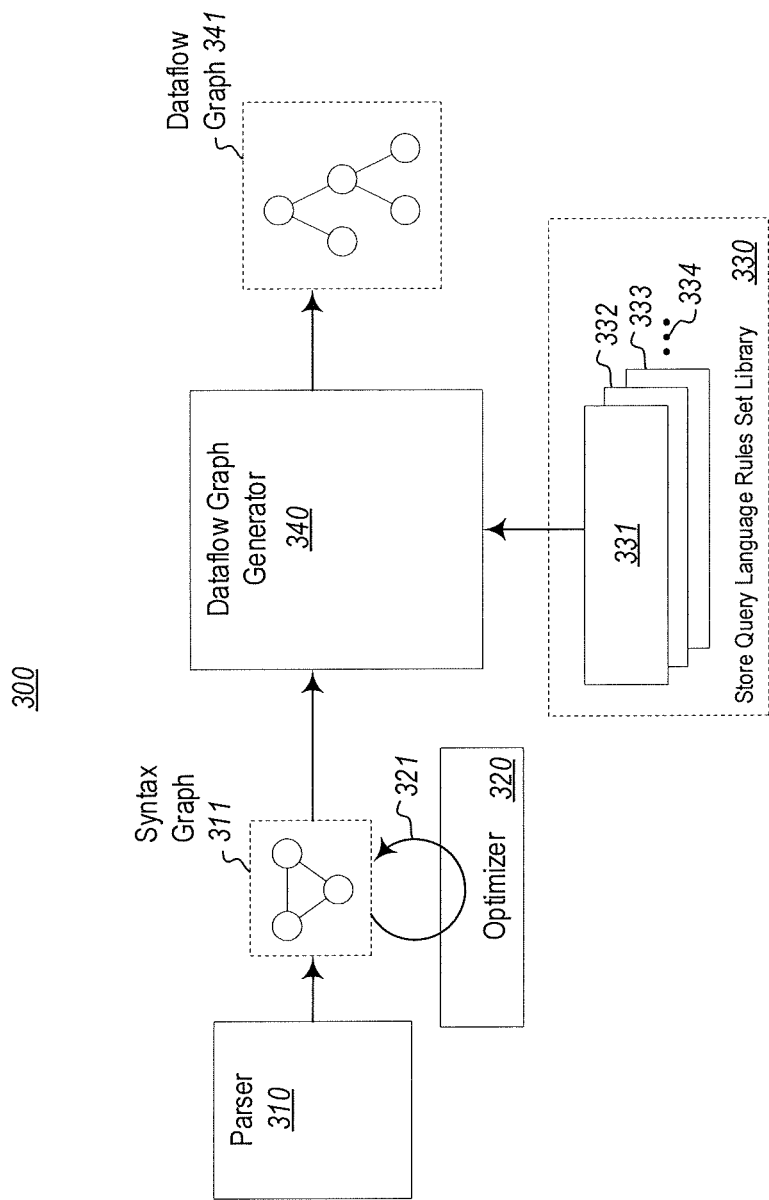
FIG. 3 illustrates a system that may be used to create a dataflow graph of a standing query using a store query portion.

FIG. 2 illustrates a flowchart of a method 200 for creating a dataflow graph of a standing query using a store query that is structured in accordance with a store query language. FIG. 3 illustrates a system 300 that may be used to create a dataflow graph of a standing query using a store query. Because the method 200 of FIG. 2 may be performed by the system 300 of FIG. 3, the method 200 of FIG. 2 will now be described with respect to the system 300 of FIG. 3.

The method 200 is initiated by accessing a store query that is structured in accordance with a store query language (act 201). Referring to FIG. 3, the system 300 includes a parser 310 that receives queries in the store query language. Thus, the parser 310 may perform the act 201 by accessing each store query. The parser 310 is an example of an executable component 106 described above with respect to FIG. 1.

In addition to accessing the store query itself, the method 200 also includes accessing a set of rules of a store query language of the store query (act 202). This act 202 is shown in parallel with act 201 simply to emphasize that there is no temporal dependency between the time that the store query is accessed (in act 201) and the time the corresponding store query language rules is accessed (in act 202). As one example, the store query might first be accessed (act 201), the store query language of that store query might then be identified, and then the store query language rules set is accessed (act 202). As another example, the store query language rules set might be accessed (act 202) well in advance of accessing a store query (act 201).

Referring to FIG. 3, the system 300 includes a store query language rules set library 330. There may be a rule set of each of the different store query languages of the store queries of which the system 300 may be asked to create a dataflow graph.

The store query language rules set library 330 is illustrated as including three store query language rules sets 331, 332 and 333. However, the ellipses 334 represent that the store query language rules set library 330 may include any number of store query language rules sets. For instance, the store query language rules set library 430 may contain but a single rules set 331 to thereby accommodate store queries that are drafted in a common store query language. On the other hand, the store query language rules set library 330 may include an enumerable quantity of store query language rules sets to thereby allow the system 300 to perform the generation of a dataflow graph for a store queries drafted in accordance with a wide variety of store query languages.

In FIG. 3, a dataflow graph generator 340 receives the store query language rules 331. Thus, the system 300 may access a set of rules of a store query language of the store query (act 202) by the dataflow graph generator 340 receiving the standing query language rules 331. By so doing, the dataflow graph generator 340 may then be prepared to receive syntax graphs for any store query of that store query language, and convert that store query into a dataflow graph of a corresponding standing query. The dataflow graph generator 340 is an example of an executable component 106 described above with respect to FIG. 1.

The method 200 includes the creation of a syntax graph of the store query (act 203). This occurs of course after the store query is accessed (act 201). However, again, the act 203 is shown in parallel with act 202 to again emphasize that, in accordance with the principles described herein, there is no temporal dependency between the time that the syntax graph is created (act 203), and the time that the store query language rules set is accessed (act 202). However, to ensure fast generation of the dataflow graph, it is advantageous to at least have that store query language rules set available by the time the syntax graph is created.

Referring to FIG. 3, the parser 310 may generate the syntax graph 311 using a store query. As an example, the syntax graph (e.g., syntax graph 311) may be or include an abstract syntax tree representation of the store query. In any case, the syntax graph 311 represents a machine-readable representation of the syntax of the store query.

Once the syntax tree is generated (act 203), the syntax tree may optionally be optimized. In FIG. 3, this might be performed by an optimizer 320. The optimization process is represented by arrow 321. During optimization, the initial syntax graph may be rewritten in one or more iterations to generate a final syntax graph. The optimizer 320 is an example of an executable component 106 described above with respect to FIG. 1.

The method 200 then includes generation of the dataflow graph using at least the syntax graph and a set of rules of a store query language of the store query (act 204). In FIG. 3, the dataflow graph generator 340 generates the dataflow graph 341 using the store query language rules 331 and using the syntax graph 311.

While not technically part of dataflow graph generation, after the dataflow graph is generated (act 204), events may be flowed into the dataflow graph of the standing query to thereby execute the standing query (act 205). This results in the dataflow graph filtering events of a particular type, and passing all or portions of the filtered events.

Thus, although the logic of the query is expressed in store query language, a standing query having that logic may be automatically generated using method 200. In other words, the matching events would be the same events that would be returned if the store query was issued against a store that included the flowed events. Furthermore, the returned parameters would be the same data that would be returned if the store query was issued against a store that included the flowed events.

Figure 4:
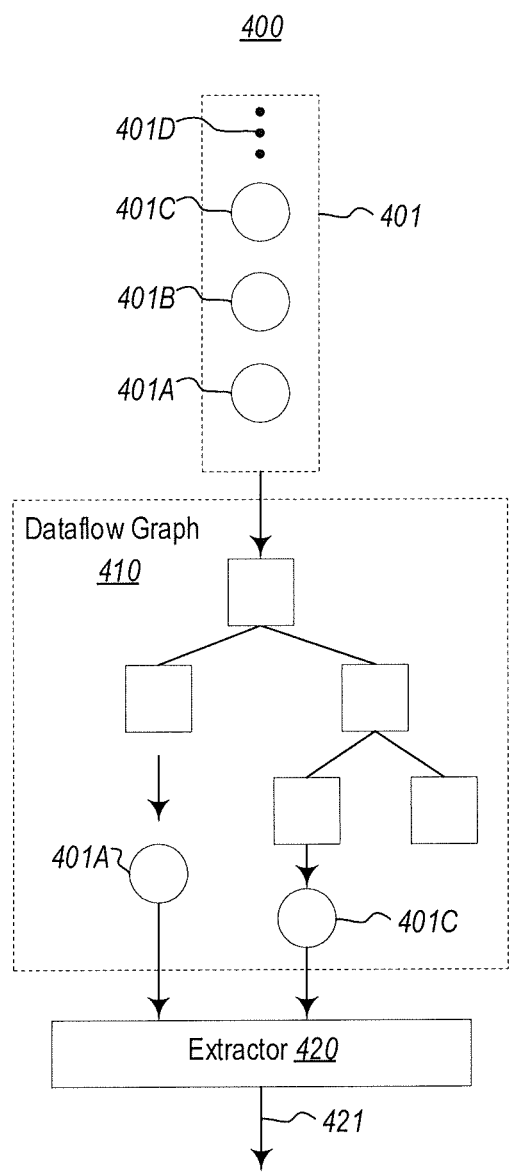
FIG. 4 illustrates an example of a dataflow graph that may be generated in accordance with the method of FIG. 2, and which may be used to execute a standing query.

FIG. 4 illustrates an example of a dataflow graph 410 that may be generated in accordance with the method 200, and which is present in a dataflow graph environment 400. The dataflow graph environment 400 includes a stream of events 401 that are fed into the dataflow graph 410. In the illustrated embodiment, the events 401 are symbolized as circles, and nodes in the dataflow graph 410 are illustrated as squares.

For instance, the events 401 that are input into the dataflow graph 410 are illustrated as including three events 401A, 401B and 401C, but the ellipses 401D represents that there may be any number of events in the event stream that is fed into the dataflow graph. The dataflow graph 410 is illustrated as having root node 410A, and other nodes 410B, 401C and 410D structured as shown. However, the structure and properties of each node, and link between nodes, will depend on the standing query itself. In any case, the dataflow graph 410 is structured to filter events in accordance with the standing query. In the illustrated example, events 401A and 401C are illustrated as passing the dataflow graph 410, whereas the other events (including event 401B appears to have been discarded by the dataflow graph 410. The events 401A and 401C are thus a filtered set of output events.

An extractor 420 then extracts the requested fields from the filtered events (as represented by arrow 421). Alternatively, the extractor 420 may be represented as a leaf node extension to the dataflow graph 410.

Figure 5:
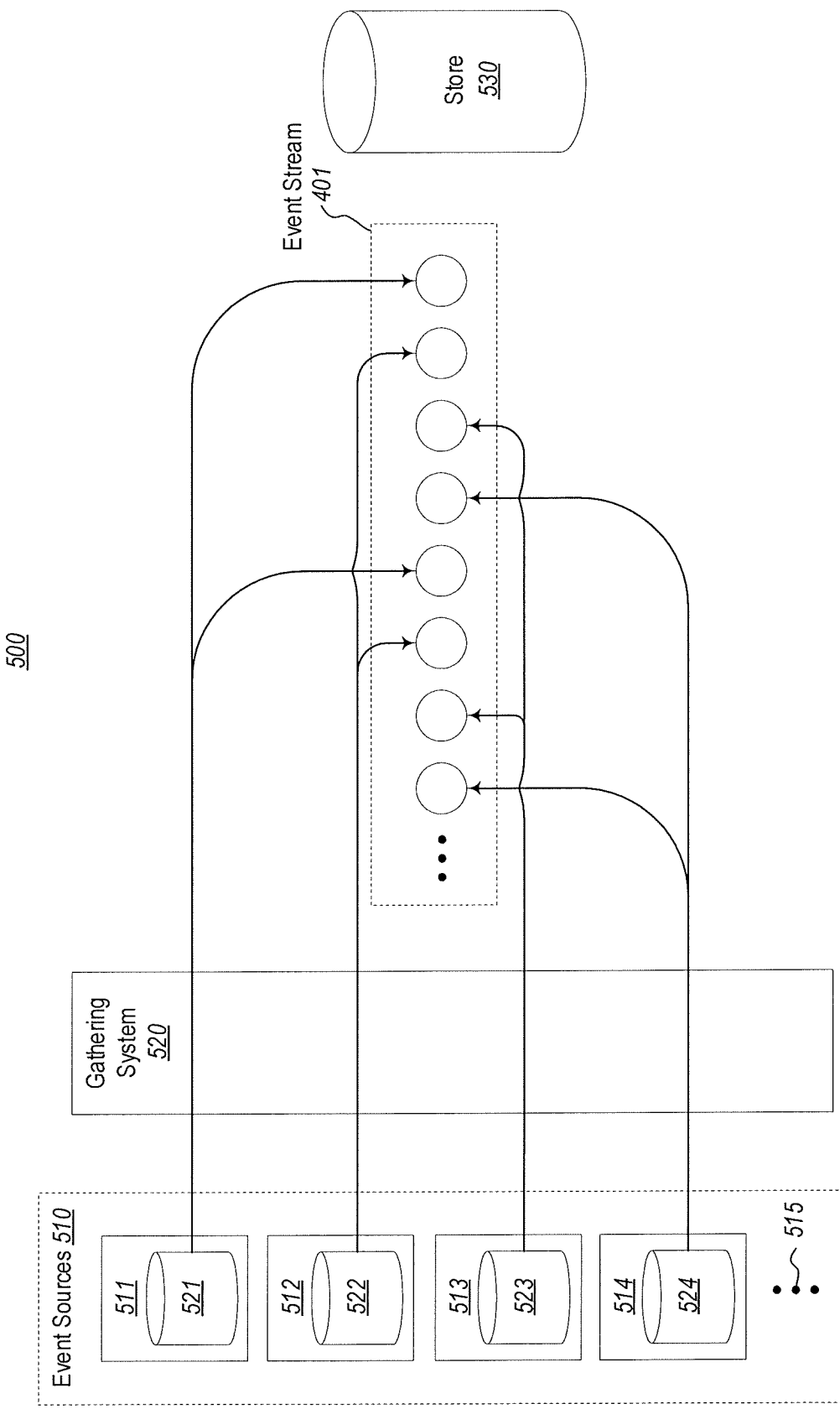
FIG. 5 illustrates an example environment in which this conversion of a store query to a standing query might be performed, in which the event stream is gathered from multiple event sources.

FIG. 5 illustrates an example environment 500 in which this conversion of a store query might be quite helpful. In this particular example, the event stream 501 is comprised of events provided by multiple sources 510. For instance, in the illustrated example of FIG. 5, the event sources 510 includes four event sources 511, 512, 513 and 514. However, the ellipses 515 represent that there may be any number of event sources contributing to the event stream. Each event source 511, 512, 513 and 514 is illustrated as contributing two events into the event stream, though the principles described herein are not limited to the quantity of events that each event source might contribute into the stream, and each might contributed a different quantity.

In one embodiment, each of the events sources 511 through 514 includes a respective local log 521 through 524. Each local log stores events that were received by that event source, or which were generated at the event source. A gathering system 520 operates to gather all or a subset of those locally stored events to thereby generate the event stream. The precise gathering system 520 is not critical to the broader aspects described herein. To ensure that the desired log events are properly uploaded, each node in the flow of the uploading process may bookmark the current position that it can confirm that the recipient has actually received. The event sources 510 may each be computing systems, such as the computing system 100 described above with respect to FIG. 1. The gathering system 520 may likewise be a computing system, such as the computing system 100 described with respect to FIG. 1.

Examples of gathering systems include direct upload systems in which each of the event sources includes an uploading module that uploads events to the event stream; an intermediary upload system that includes multiple intermediaries, each responsible for receiving events from a subset of the event sources, and then provide the result in the form of part of the event stream; and a publish/subscribe system in which the events are published into a collection, and in which the populator subscribes to certain events within the collection. The gathering system 520 may be structured as described above for the computing system 100 of FIG. 1.

The event stream may be populated into a centralized store 530. When an evaluator queries against the events in the centralized store 530, the evaluator might not know ahead of time which events might be interesting. This might be the case where an evaluator is trying to determine a security threat or operational problem that is occurring across the event sources 510.

Once the events of interest are found using store queries against the store, the evaluator might want to deploy a standing query on one or more of the event sources 510 or within an intermediary computing system that helps to gather events from at least some of the plurality of event stores into the event store (in the gathering system). The evaluator knows that the store query drafted in accordance with the store query is satisfactory to find such events. The evaluator may then use the principles described herein to automatically convert the store query into a standing query. Thus, the evaluator may have a very fast mechanism for generating standing query with identical logic to the store query. Thus, latency is reduced between the time that a satisfactory store query is arrived at, and the time a corresponding standing query is generated.

Thus, in accordance with the principles described herein, the developer may quickly generate a standing query that may be deployed upstream of the store. These standing queries of course provide much faster notification when similar events have been found in the future by applying the same logic that was within the store query with the standing queries. This provides a speed of deployment advantage which mitigates the window of opportunity for those that would take advantage of a security vulnerability, or the window of damage that would be caused by an operational problem.

Figure 6:
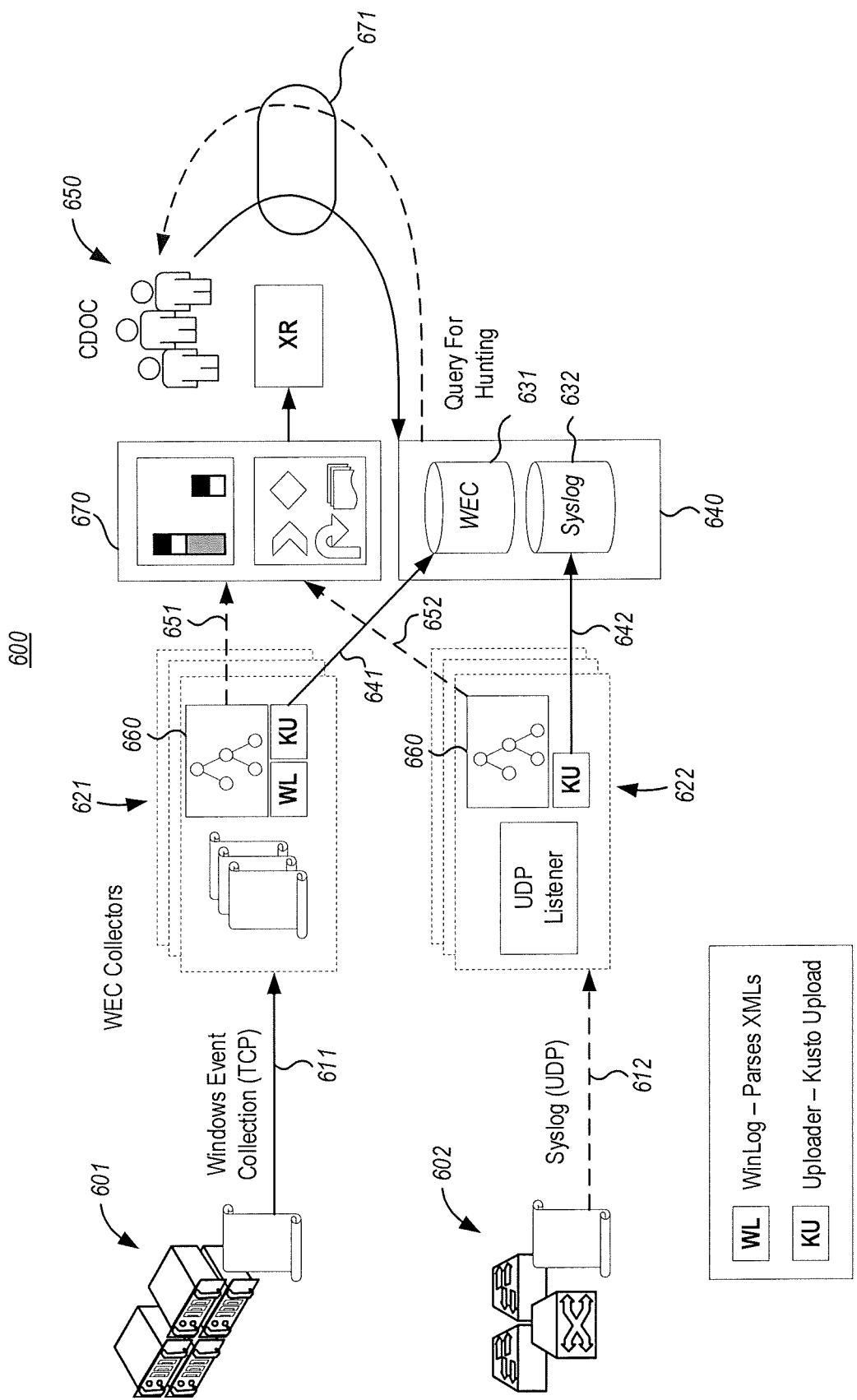
FIG. 6 illustrates an example environment in which there are two event gathering systems and standing queries inserted into the event gathering path.

FIG. 6 illustrates an environment 600 that shows a combination of two points of flexibility. Firstly, there are many thousands of event sources within two different event systems that are being gathered into distinctive logs. The first event system includes event sources 601 that provide a first event stream 611 to a first gathering system 621, for collection (as represented by arrow 641) of the events into a first event store 631. A second event system includes event sources 602 that provide a second event stream 612 to a second gathering system 622, for collection (as represented by arrow 642) of the events into a second event store 642.

As one example only, the first event system operates with WINDOWS event collection (WEC) events, and the second event system operates with Syslog events. WEC events are transmitted to intermediary computing systems (called WEC collectors) via the Transmission Control Protocol (TCP). Syslog events are published to a User Datagram Protocol (UDP) listeners using a UDP protocol. Thus, the first point of flexibility is that the principles described herein may be employed with multiple different gathering systems.

As a second point of flexibility, the standing queries that are generated may be deployed to formulate two parallel paths for each gathering system. One path has been described and is represented by arrow 641 for the first gathering system 621, and as arrow 642 for the second gathering system 622. This allows for a large store 640 that includes the two event stores 631 and 632. Users 650 may query against the data stores using store queries and responses (as represented by arrows 671) to find interesting patterns.

The principles described herein may then be used to automatically convert the store query into a standing query, wherein such can be deployed inside the gathering system. For instance, the gathering system 621 has a standing query 660 deployed there, which allows for alerts 661 to be sent to an alert processing system 670. A similar standing query 660 may be deployed in the second gathering system 622, to thereby create alerts 652 to also be sent to the alert processing system 670. Thus, for queries of great interest, the alert processing system may find out about those events with negligible latency, and without having to reform or reissue a new query each time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to facilitate an improvement in computer security by identifying computer security threats upstream from a database, said computing system comprising:
   one or more processors; and
   one or more computer-readable hardware storage devices that store computer-executable instructions that are executable by the one or more processors to cause the computing system to at least:
      access a store query that is structured in accordance with a store query language, wherein the store query is configured to query a database that stores events received from a data stream, and the store query is verified as being known to return results that potentially correspond to security threats when queried against the events after the events are stored in the database;
      create a syntax graph of the store query;
      access a set of rules of the store query language of the store query;
      use at least the syntax graph and the set of rules of the store query language to convert the store query into a standing query;
      deploy a first instance of the standing query into a first intermediary computing system and deploy a second instance of the standing query into a second intermediary computing system, wherein:
         the first intermediary computing system is situated between a first event source and the database, and the second intermediary computing system is situated between a second event source and the database;
         the first intermediary computing system is configured to gather new events originating from the first event source, and the second intermediary computing system is configured to gather new events originating from the second event source;
         a plurality of nodes are involved in uploading said new events to the data stream, and each node in the plurality of nodes bookmarks which new events the first intermediary computing system and/or the second intermediary system has received;
         the first intermediary system is further configured to receive events from the first event source using a transmission control protocol (TCP) such that the first instance of the standing query operates on TCP-based events; and
         the second intermediary system is configured to receive events from the second event source using a user datagram protocol (UDP) such that the second instance of the standing query operates on UDP-based events; and
      execute the first instance of the standing query and the second instance of the standing query against the new events that are uploaded in the data stream and that originate from the first and the second event sources, wherein the standing query, including any instances thereof, is configured to identify specific events that correspond to potential computer security threats and to generate alerts for the specific events.

2. The computing system in accordance with claim 1, further comprising:
   flowing events into the standing query to generate a plurality of matching events that match the standing query, wherein the standing query is a dataflow graph.

3. The computing system in accordance with claim 2, wherein accessing the store query comprises:
   accessing a particular store query that is structured in accordance with the store query language and that was tested against an event store in which a plurality of events is gathered from a plurality of event sources.

4. The computing system in accordance with claim 3, the flowed events being events streamed from at least some of the plurality of event sources.

5. The computing system in accordance with claim 4, further comprising:
   deploying the standing query into at least one of the at least some of the plurality of event sources.

6. The computing system in accordance with claim 2, the plurality of matching events corresponding to events that would be returned if the store query was issued against a store that included the flowed events.

7. The computing system in accordance with claim 1, the syntax graph comprising an abstract syntax tree of the store query.

8. The clegalleomputing system in accordance with claim 1, the creating of the syntax graph comprising:
   creating an initial syntax graph based on the store query; and
   rewriting the initial syntax graph.

9. The computing system in accordance with claim 1, wherein accessing the store query comprises:
   accessing a particular store query that is structured in accordance with the store query language and that was tested against a store in which a plurality of events is gathered from a plurality of event sources.

10. A method for converting a store query into a standing query, the standing query being configured to facilitate an improvement in computer security by identifying computer security threats upstream from a database, the method comprising:
    accessing a store query that is structured in accordance with a store query language, wherein the store query is configured to query a database that stores events received from a data stream, and the store query is verified as being known to return results that potentially correspond to security threats when queried against the events after the events are stored in the database;
    creating a syntax graph of the store query;

accessing a set of rules of the store query language of the store query;

using at least the syntax graph and the set of rules of the store query language to convert the store query into a standing query;

deploying a first instance of the standing query into a first intermediary computing system and deploy a second instance of the standing query into a second intermediary computing system, wherein:

the first intermediary computing system is situated between a first event source and the database, and the second intermediary computing system is situated between a second event source and the database;

the first intermediary computing system is configured to gather new events originating from the first event source, and the second intermediary computing system is configured to gather new events originating from the second event source;

a plurality of nodes are involved in uploading said new events to the data stream, and each node in the plurality of nodes bookmarks which new events the first intermediary computing system and/or the second intermediary system has received;

the first intermediary system is further configured to receive events from the first event source using a transmission control protocol (TCP) such that the first instance of the standing query operates on TCP-based events; and the second intermediary system is configured to receive events from the second event source using a user datagram protocol (UDP) such that the second instance of the standing query operates on UDP-based events; and executing the first instance of the standing query and the second instance of the standing query against the new events that are uploaded in the data stream and that originate from the first and the second event sources, wherein the standing query, including any instances thereof, is configured to identify specific events that correspond to potential computer security threats and to generate alerts for the specific events.

11. The method in accordance with claim 10, further comprising:

flowing events into the standing query to generate a plurality of matching events that match the standing query.

12. The method in accordance with claim 11, the accessing of the store query comprising:

accessing a particular store query that is structured in accordance with the store query language and that was tested against an event store in which a plurality of events is gathered from a plurality of event sources.

13. The method in accordance with claim 12, the flowed events being events streamed from at least some of the plurality of event sources.

14. The method in accordance with claim 13, further comprising:

deploying the standing query into at least one of the at least some of the plurality of event sources.

15. The method in accordance with claim 11, the plurality of matching events corresponding to events that would be returned if the store query was issued against a store that included the flowed events.

16. The method in accordance with claim 10, the syntax graph comprising an abstract syntax tree of the store query.

17. The method in accordance with claim 10, the accessing of the store query comprising:

accessing a store query that is structured in accordance with the store query language and that was tested against a store in which a plurality of events is gathered from a plurality of event sources.

18. One or more computer-readable hardware storage devices comprising physical memory that store computer executable instructions that are executable by one or more processors of a computing system to at least:

access a store query that is structured in accordance with a store query language, wherein the store query is configured to query a database that stores events received from a data stream, and the store query is verified as being known to return results that potentially correspond to security threats when queried against the events after the events are stored in the database;

create a syntax graph of the store query;

access a set of rules of the store query language of the store query;

use at least the syntax graph and the set of rules of the store query language to convert the store query into a standing query;

deploy a first instance of the standing query into a first intermediary computing system and deploy a second instance of the standing query into a second intermediary computing system, wherein:

the first intermediary computing system is situated between a first event source and the database, and the second intermediary computing system is situated between a second event source and the database;

the first intermediary computing system is configured to gather new events originating from the first event source, and the second intermediary computing system is configured to gather new events originating from the second event source;

a plurality of nodes are involved in uploading said new events to the data stream, and each node in the plurality of nodes bookmarks which new events the first intermediary computing system and/or the second intermediary system has received;

the first intermediary system is further configured to receive events from the first event source using a transmission control protocol (TCP) such that the first instance of the standing query operates on TCP-based events; and the second intermediary system is configured to receive events from the second event source using a user datagram protocol (UDP) such that the second instance of the standing query operates on UDP-based events; and execute the first instance of the standing query and the second instance of the standing query against the new events that are uploaded in the data stream and that originate from the first and the second event sources, wherein the standing query, including any instances thereof, is configured to identify specific events that correspond to potential computer security threats and to generate alerts for the specific events.

* * * * *